United States Patent Office 2,922,785
Patented Jan. 26, 1960

2,922,785
CERTAIN 3-BENZAL DIHYDROPYRIDINES

Herman Levin, San Antonio, Tex.

No Drawing. Application March 4, 1959
Serial No. 797,030

5 Claims. (Cl. 260—240)

This invention relates to new pyridine derivatives having anti-corrosive properties and to the method for the preparation of the same.

More in particular this invention relates to the preparation of dihydropyridine.

This application is a continuation-in-part of my prior application Serial No. 425,326, filed April 23, 1954, now abandoned, entitled Corrosion Inhibitor, and Serial No. 603,794, filed August 13, 1956, entitled Hydropyridine Derivative, now abandoned.

It is an object of the present invention to produce hydrogenated pyridine by simple condensation.

The present invention comprises the use of substances prepared by condensing in a liquid phase aliphatic and aromatic aldehydes with ammonia or an ammonia derivative in such a manner as to produce a substituted hydrogenated pyridine compound having a substituted group or groups containing 6 to 20 carbon atoms of the general formula $$(C_5H_{(3+a)}N)R_b$$

wherein $a$ is an integer from 0 through 5 and $b$ is an integer from 1 to 3, and the sum of $a+b$ is greater than 2 and less than 7, and R represents at least one substance selected from the group consisting of alkyl and aryl; which substance is attached to the ring.

These condensations are carried out in the presence of ammonia (liquid or vapor) ammonium carbonate, ammonium sulfate or similar compounds which will release ammonia continuously to the reaction system during the course of the reaction.

Example 1 (Compound D)

39. g. (0.248 g-mole) ammonium carbonate (31 wt. percent NH₃)
55. g. (0.415 g-mole) cinnamaldehyde
60. g. (0.83 g-mole) n-butyraldehyde heated to a temperature of 61 to 65° C. (142–150° F.) under atmospheric pressure for 25 minutes. An orange phase (103.4 grams) was recovered. Vacuum distillation at 30 mm. Hg. absolute and room temperature, using nitrogen gas, yielded 75 g. of an orange liquid product which was experimentally found to have a molecular weight of 242. The major portion of the mixed product is 3-benzal-5-ethyl-2-propyl-dihydropyridine-(2,3) whose theoretical molecular weight is 239.

Example 2 (Compound A)

14 g. (0.09 g-mole) ammonium carbonate (31 wt. percent NH₃)
36.8 g. (0.42 g-mole) cinnamaldehyde
55 g. (0.84 g-mole) acetaldehyde heated to a temperature of 45° C. (113° F.) under atmospheric pressure for 35 minutes. An orange-red oil phase (74 grams) was recovered. Vacuum distillation yielded a similarly colored product which was experimentally found to have a molecular weight of 193. The major portion of the mixed product is 3-benzal-2-methyl-dihydropyridine-(2,3) whose theoretical molecular weight is 183.

Example 3 (Compound B)

21.8 g. (0.14 g-mole) ammonium carbonate (31 wt. percent NH₃)
55. g. (0.42 g-mole) cinnamaldehyde
54.8 g. (1.26 g-mole) acetaldehyde heated to a temperature of 45° C. (113° F.) under atmospheric pressure for 45 minutes. A red oil phase (81 grams) was recovered. Vacuum distillation yielded a red liquid product which was experimentally found to have a molecular weight of 202. The major portion of the mixed product is 3-benzal-2-propenyl-(1)-dihydropyridine-2,3) whose theoretical molecular weight is 209.

Example 4 (Compound C)

30. g. (0.19 g-mole) ammonium carbonate (31 wt. percent NH₃)
55. g. (0.42 g-mole) cinnamaldehyde
94. g. (1.68 g-mole) acetaldehyde heated to a temperature of 45° C. (113° F.) under atmospheric pressure for 60 minutes. A red oil phase (85 grams) was recovered. Vacuum distillation yielded a red liquid product which was experimentally found to have a molecular weight of 234. The major portion of the mixed product is 3-benzal-2-pentadienyl-(1,3)-dihydropyridine-2,3) whose theoretical molecular weight is 233.

In the same manner the following compounds were prepared:

| Compound Designation | Chemical name | Prepared from— | Mol ratio |
|---|---|---|---|
| A | 3-benzal-2-methyl dihydropyridine (2,3). | cinnamaldehyde: acetaldehyde. | 1:2 |
| B | 3-benzal-2-propenyl-(1)-dihydropyridine (2,3). | ___do___ | 1:3 |
| C | 3-benzal-2-pentadienyl-(1,3)-dihydropyridine (2,3). | ___do___ | 1:4 |
| D | 3-benzal-5-ethyl-2-propyl-dihydropyridine (2,3). | cinnamaldehyde: n-butyraldehyde. | 1:2 |
| E | 5-amyl-3-ethyl-2-propyl-dihydropyridine (2,3). | n-butyraldehyde: n-heptaldehyde. | 2:1 |
| F | 3,5-diethyl-2-propyl-dihydropyridine (2,3). | n-butyraldehyde | 3 |

A major derivative obtained by Example 1 is 3-benzal-5-ethyl-2-propyl-dihydropyridine (2,3). This may be converted to its corresponding pyridine derivative by mild oxidation or to its corresponding tetrahydro or hexahydro derivatives by reduction with sodium alcohol or by hydrogenation using a suitable catalyst. Reduction of the ring also result in reduction of the benzal grouping. Selective reduction of the benzal to a benzyl grouping without reduction of the ring nucleus can be accomplished by hydrogen under suitable conditions.

The pyridine ring may be hydrogenated using sodium and alcohol by well known methods.

| Compound Designation | Chemical name | Prepared from— |
|---|---|---|
| Hydrogenated A | 3-benzyl-2-methyl tetrahydropyridine. | Compound A—sodium ethanol. |
| Hydrogenated B | 3-benzyl-2-propyl tetrahydropyridine. | Compound B—sodium ethanol. |
| Hydrogenated C | 3-benzyl-2-amyl tetrahydropyridine. | Compound C—sodium ethanol. |
| Hydrogenated D | 3-benzyl-5-ethyl-2-propyl tetrahydropyridine. | Compound D—sodium ethanol. |

It has been found that these compounds reduce the corrosion of steel as much as 99.91% when exposed to extreme surface conditions as immersion in 15% by weight hydrochloric acid solution at a temperature of 300° F.

and a pressure of 6,000 p.s.i., the concentration of the inhibitor being 0.15% by weight based on the concentration of the acid.

It will be evident from the above description that this invention provides new pyridine derivatives which will be of great interest because of their valuable properties to those desiring to protect metal from corrosion.

What is claimed is:
1. A compound of the structure

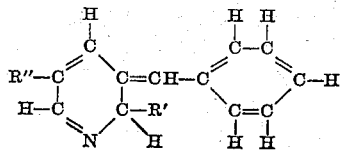

where R' is a member of the class consisting of methyl, propyl, propenyl and pentadienyl and R" is a member of the class consisting of hydrogen, ethyl and amyl.

2. As a composition of matter, 3-benzal-2-methyl-dihydropyridine-(2,3).

3. As a composition of matter, 3-benzal-2-propenyl-(1)-dihydropyridine-2,3).

4. As a composition of matter, 3-benzal-2-pentadienyl-(1,3)-dihydropyridine-(2,3).

5. As a composition of matter, 3-benzal-5-ethyl-2-propyldihydropyridine-(2,3).

No references cited.